(12) United States Patent
Choi et al.

(10) Patent No.: US 7,573,543 B2
(45) Date of Patent: Aug. 11, 2009

(54) LIGHT GUIDE PANEL AND DISPLAY DEVICE EMPLOYING THE SAME

(75) Inventors: Jin-seung Choi, Suwon-si (KR); Jee-hong Min, Yongin-si (KR); Jin-Hwan Kim, Suwon-si (KR)

(73) Assignee: Samsung Electro-Mechanics Co., Ltd, Suwon-Si (KR)

( * ) Notice: Subject to any disclaimer, the term of this patent is extended or adjusted under 35 U.S.C. 154(b) by 390 days.

(21) Appl. No.: 11/505,896

(22) Filed: Aug. 18, 2006

(65) Prior Publication Data

US 2007/0165423 A1 Jul. 19, 2007

(30) Foreign Application Priority Data

Jan. 16, 2006 (KR) ...................... 10-2006-0004479

(51) Int. Cl.
G02F 1/1335 (2006.01)
G02F 1/13357 (2006.01)
G02B 6/00 (2006.01)
G02B 6/10 (2006.01)

(52) U.S. Cl. .................... 349/65; 385/129; 385/901
(58) Field of Classification Search ............ 349/65
See application file for complete search history.

(56) References Cited

U.S. PATENT DOCUMENTS 7,139,048 B2 * 11/2006 Han et al. ................. 349/62
2004/0071437 A1 * 4/2004 Tamura et al. ............ 385/146
2004/0161222 A1 * 8/2004 Niida et al. .............. 385/146
2004/0207775 A1 * 10/2004 Min et al. .................. 349/65
2004/0264911 A1 * 12/2004 Toeda et al. .............. 385/146
2006/0233489 A1 * 10/2006 Liao ........................... 385/31

FOREIGN PATENT DOCUMENTS

EP         1521229 A2        4/2005
JP         2001-23423 A      1/2001
KR    10-2004-0090070 A     10/2004

OTHER PUBLICATIONS

Dmitri Nesterenko et al.: "40.4: Design and Analysis of Tapered Waveguides as Collimators for LED Backlighting", 2005 SID International Symposium. Boston, MA, May 24-27, 2005, SID International Symposium, San Jose, CA,: SID, US, May 24, 2005, pp. 1388-1391, XP007012309.

* cited by examiner

Primary Examiner—Michelle R Connelly Cushwa
(74) Attorney, Agent, or Firm—Sughrue Mion, PLLC (57) ABSTRACT

Provided are a light guide panel and a display device employing the same. The light guide panel includes: an incidence surface facing a plurality of light sources separated apart a predetermined distance; at least one dark portion reducing unit that is formed on the incidence surface between adjacent pairs of the slight sources and at both edges of the incidence surface, and reflects the light incident from the light sources to reduce the creation of dark portion units; an upper surface transmitting a portion of incident light and reflecting the rest of the incident light; and a lower surface facing the upper surface and reflecting the light incident from the incidence surfaces and dark portion reducing units.

24 Claims, 9 Drawing Sheets

000# LIGHT GUIDE PANEL AND DISPLAY DEVICE EMPLOYING THE SAME

CROSS-REFERENCE TO RELATED PATENT APPLICATION

This application claims priority from Korean Patent Application No. 10-2006-0004479, filed on Jan. 16, 2006 in the Korean Intellectual Property Office, the disclosure of which is incorporated herein in its entirety by reference.

BACKGROUND OF THE INVENTION

1. Field of the Invention

The present invention relates to a light guide panel in which the generation of dark portions in a light incidence area is reduced and a display device employing the same.

2. Description of the Related Art

In general, liquid crystal displays, which include the light receiving type flat displays used in laptop computers, desktop computers, LCD TVs, and mobile communication terminals, do not form images by emitting light by themselves but by selectively emitting illumination light radiated from an external source such as backlight units installed behind the liquid crystal displays.

Backlight units can be classified into direct light type backlight units and edge light type backlight units according to the arrangement of the light source. A direct light type backlight unit includes a plurality of lamps that are installed directly under a liquid crystal display and emit light directly onto a liquid crystal panel.

A direct light type backlight unit can be installed in a desired position on a broad surface and, thus, is appropriate for a large screen display device such as an LCD TV larger than 30 inches. An edge light type backlight unit is appropriate for small or medium sized displays like monitors or cell phones since the light source thereof is installed at a lateral side of a light guide panel.

Figure 1:
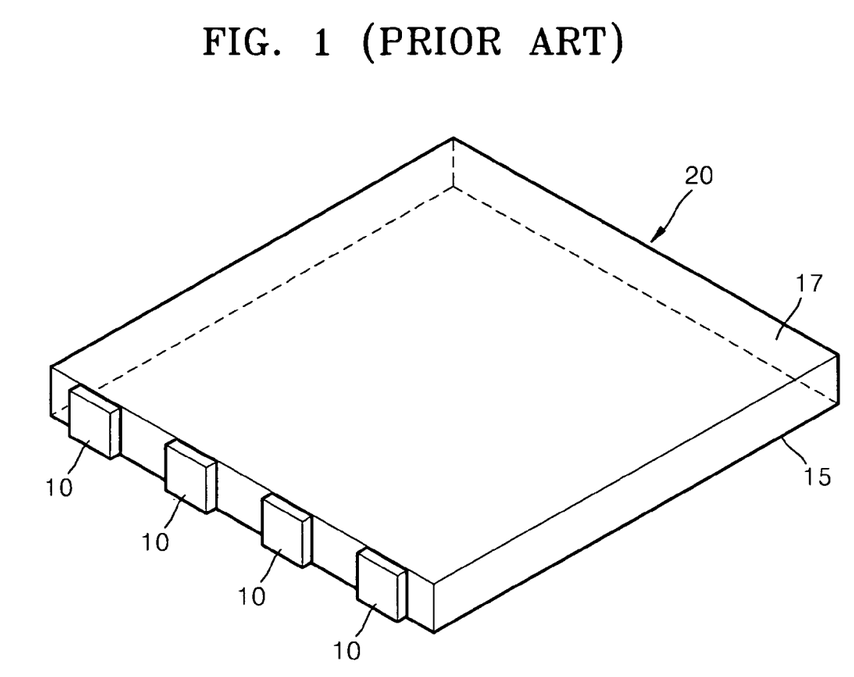
FIG. 1 is a perspective view of a light guide panel used in a conventional backlight unit.

FIG. 1 is a perspective view of a conventional edge light type backlight unit. Referring to FIG. 1, a light emitting device (LED) 10 installed at a side of a light guide panel (LGP) 20 emits light, and the emitted light is transferred to a liquid crystal panel via the LGP 20. A lower surface 15 of the LGP 20 is a reflection surface for advancing light toward the display panel. The light emitted from the LED 10 is converted into surface light by the LGP 20 and exits through an upper surface 17 of the LGP 20.

Figure 2:
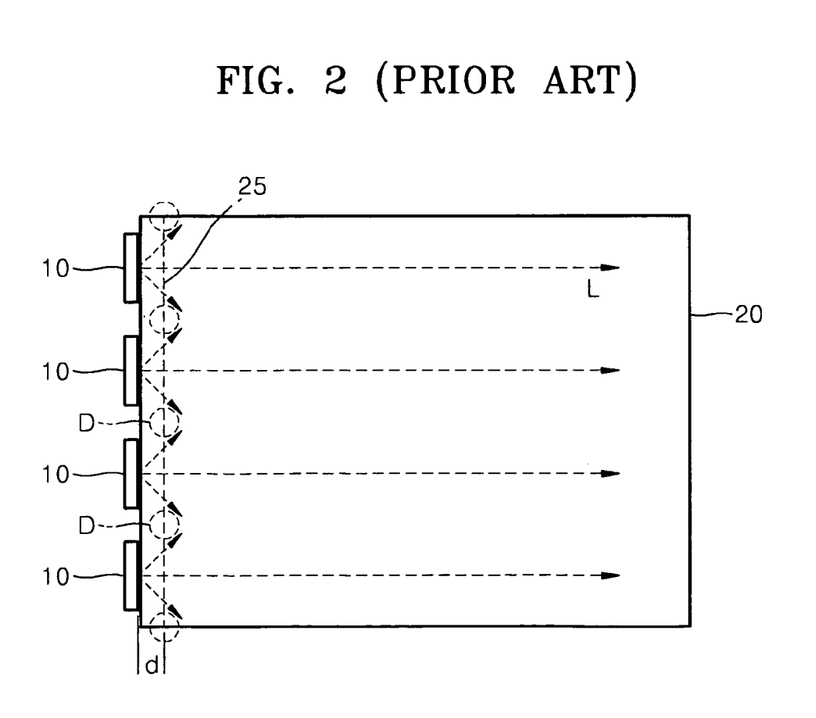
FIG. 2 illustrates dark portions created in the light guide panel of FIG. 1.
Figure 3:
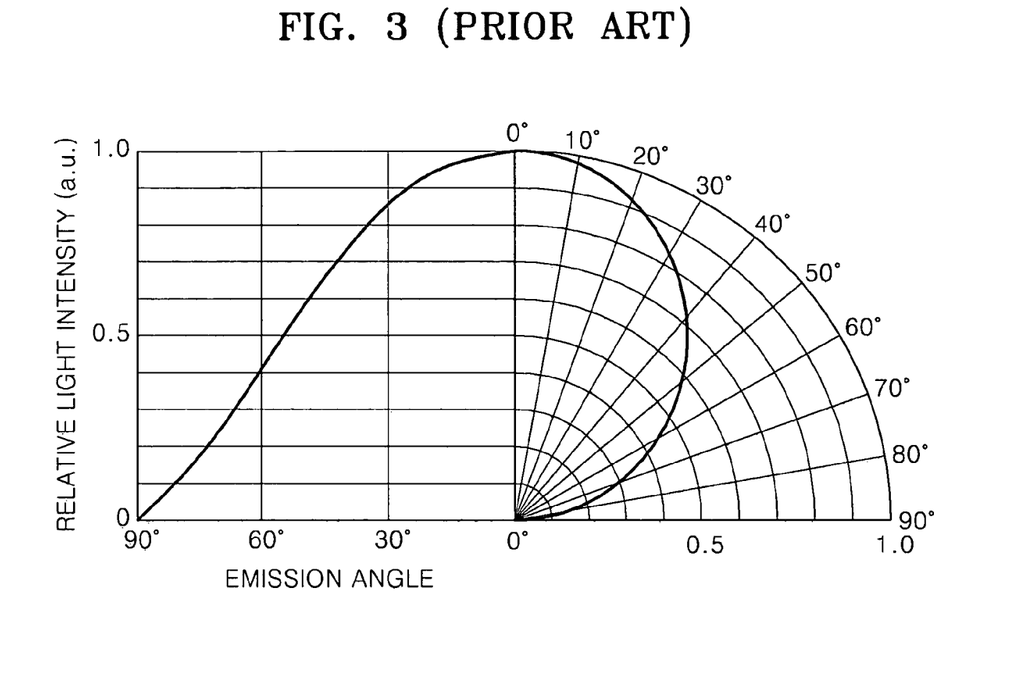
FIG. 3 illustrates the light emitting efficiency according to emission angle in a conventional light emitting device (LED)

FIG. 2 illustrates the light from the LED 10 traveling through the LGP 20. Referring to FIG. 2, dark portions D having low brightness are created on the incident surface of the LGP 20 because of relatively little light arriving from the light source. FIG. 3 illustrates the light emitting efficiency according to the light emission angle of the LED 10. The light emitting efficiency of the LED 10 decreases from 0° to 90°. In other words, most of the light from the LED 10 is emitted forward, and thus the amount of light emitted laterally is relatively small. Accordingly, as illustrated in FIG. 2, the dark portions D, that is, areas where small quantities of light arrive from the LED 10, exist. The dark portions D cause irregular brightness and, thus, result in decreased display quality. Accordingly, an area within a distance d from the LED 10, where the dark portions D are created, is not included in a portion of the screen used for viewing. That is, the area away from the dark portions D is used as an effective screen 25. The area within the distance d from the LED 10 is unused and, thus, the miniaturization of the backlight unit may be difficult.

SUMMARY OF THE INVENTION

The present invention provides a light guide panel in which the generation of dark portions where little light exists is reduced to provide uniform brightness and a display device employing the light guide panel.

According to an aspect of the present invention, there is provided a light guide panel comprising: an incidence surface facing a plurality of light source and which transmits light from the light sources; an upper surface which transmits light transmitted through the incidence surface; at least one dark portion reducing unit formed in the incidence surface below the upper surface and positioned along the incidence surface adjacent to a position of the light source, and which reflects light toward the upper surface. The at least one dark portion reducing unit reduces the creation of a dark portion and a lower surface facing the upper surface and reflecting the light incident from the incident surfaces and dark portion reducing units.

The dark portion reducing units may be grooves that are oblique from the incidence surfaces toward the lower surface.

The dark portion reducing units may be formed into a curved surface or have a plurality of flat surfaces.

The dark portion reducing units may be semi-conical or semispherical.

The dark portion reducing units may be semi-pyramidal.

The dark portion reducing units may be symmetrical about vertical center lines extending in a direction normal to the upper surface.

A vertex on the incidence surfaces of the dark portion reducing units may be separated from the upper surface.

Diffusion units that are disposed on the incidence surface facing the light sources and diffuse the incident light from the light sources may be further included.

Each of the diffusion units may have a saw-toothed pattern.

According to another aspect of the present invention, a plurality of light sources disposed along the incidence surface and separated by a predetermined distance. The dark reducing unit may be disposed between adjacent light sources.

According to another aspect of the present invention, there is provided a display device comprising: a plurality of light sources; a light guide panel comprising: an incidence surface facing the light sources; at least one dark portion reducing unit disposed along the incidence surface between adjacent pairs of the light sources or at an edge of the incidence surface, and which reflects light from the light sources; an upper surface disposed at an angle to the incident surface and which transmits light; and a lower surface facing the upper surface and which reflects light toward the upper surface; and a display panel which forms an image using the light transmitted from the upper surface of the light guide panel.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

The present invention will now be described more fully with reference to the accompanying drawings, in which non-limiting exemplary embodiments of the invention are shown.

Figure 4:
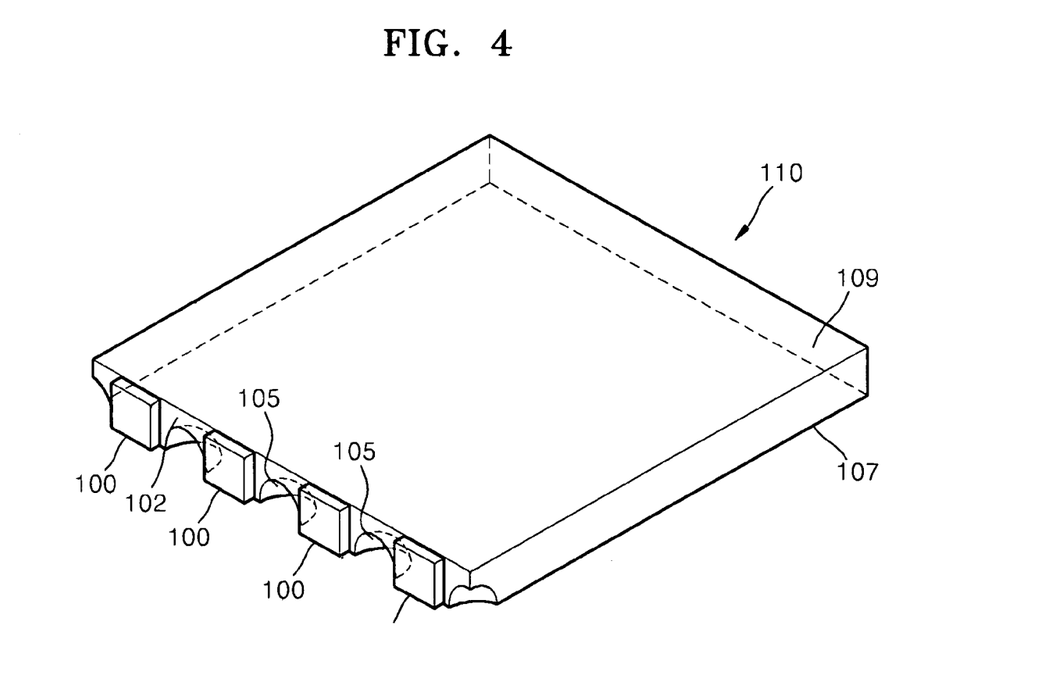
FIG. 4 is a perspective view of a light guide panel according to an exemplary embodiment of the present invention.

FIG. 4 is a perspective view of a light guide panel 110 according to an exemplary embodiment of the present invention. Referring to FIG. 4, the light guide panel 110 includes an incidence surface 102 facing a plurality of light sources 100 that are separated a predetermined distance, and dark portion reducing units 105. The light guide panel 110 guides the light received from the light sources 100 formed at a lateral side of the light guide panel 110 to a screen (not shown) and includes an upper surface 109 transmitting a portion of incident light toward the screen and reflecting the rest of the light and a lower surface 107 facing the upper surface 109 and reflecting incident light.

Figure 5:
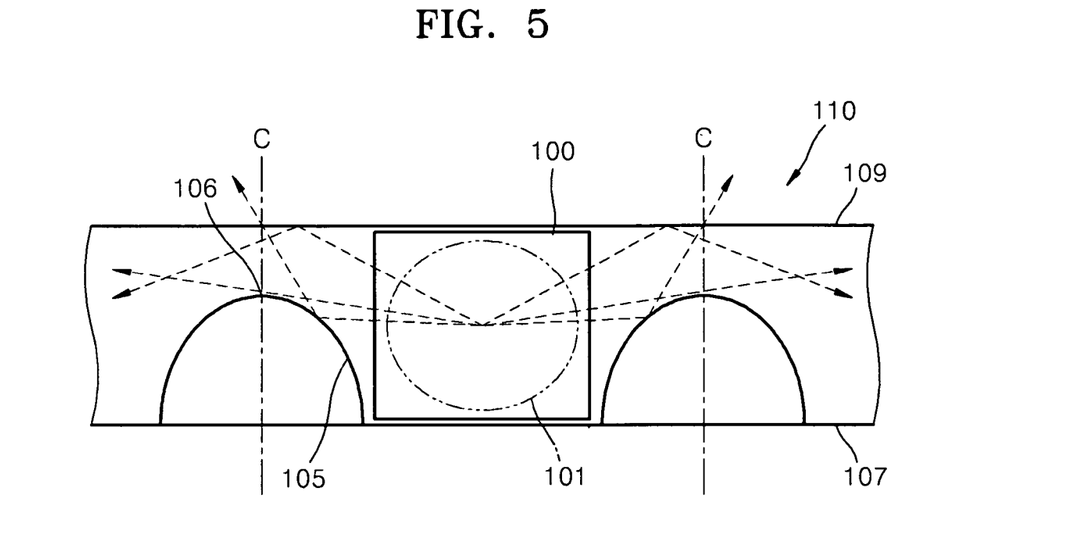
FIG. 5 illustrates the optical path at an incidence surface of the light guide panel of FIG. 4.

The dark portion reducing units 105 reduce the creation of the dark portions where relatively less light arrives from the light sources 100 and are formed of grooves that are oblique and extend between incidence surfaces 102 and the lower surface 107. The dark portion reducing units 105 may be curved in shape of, for example, semi-cones or hemispheres. The dark portion reducing units 105 are symmetrical about vertical center lines C as illustrated in FIG. 5 and have a vertex 106 on the vertical center line C. Since the dark portion reducing portions 105 are symmetrical, light from the light sources 100 is reflected symmetrically and, thus, can improve the uniformity of the brightness. Also, the vertex 106 is disposed a predetermined distance from the upper surface 109 and, thus, a reduction in an effective surface of the upper surface 109 due to the dark portion reducing units 105 may be prevented.

The light sources 100 may be, for example, light emitting diodes and may emit light through a light emitting window 101. The light emitted from the light sources 100 passes through the incidence surfaces 102 and travels forward or sideward. A portion of the light travelling sideways is reflected by the dark portion reducing units 105 and proceeds toward the upper surface 109. The light proceeding upward is transmitted through the upper surface 109 or is reflected to the lower surface 107. A portion of the light proceeding sideways from the light sources 100 proceeds via the dark portion reducing units 105 toward the upper surface 109 and, thus, light is supplied to the region above the dark portion reducing units 105. Thus the creation of dark portions can be suppressed.

Figure 6:
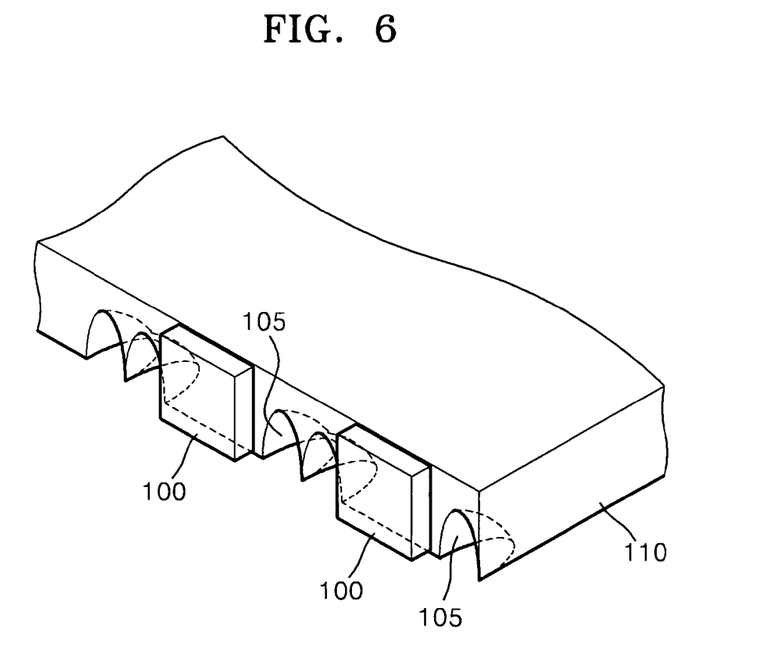
FIG. 6 is a modified example of a light guide panel shown in FIG. 4.

The dark portion reducing units 105 are disposed in an area where relatively less light arrives, that is, on incidence surfaces between the light sources 100 and at both edges of the incidence surfaces 102. At least one dark portion reducing unit 105 is formed between each pair of the adjacent light sources 100, and a plurality of dark portion reducing units 105 may be formed as illustrated in FIG. 6.

Figure 7A:
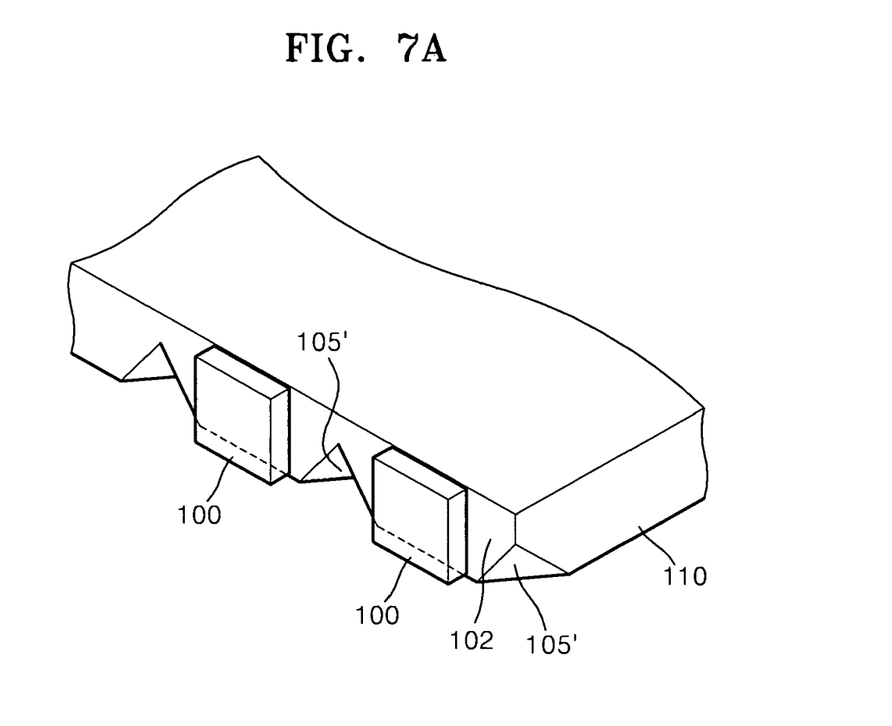
FIG. 7A is a perspective view of a light guide panel according to another exemplary embodiment of the present invention.
Figure 7B:
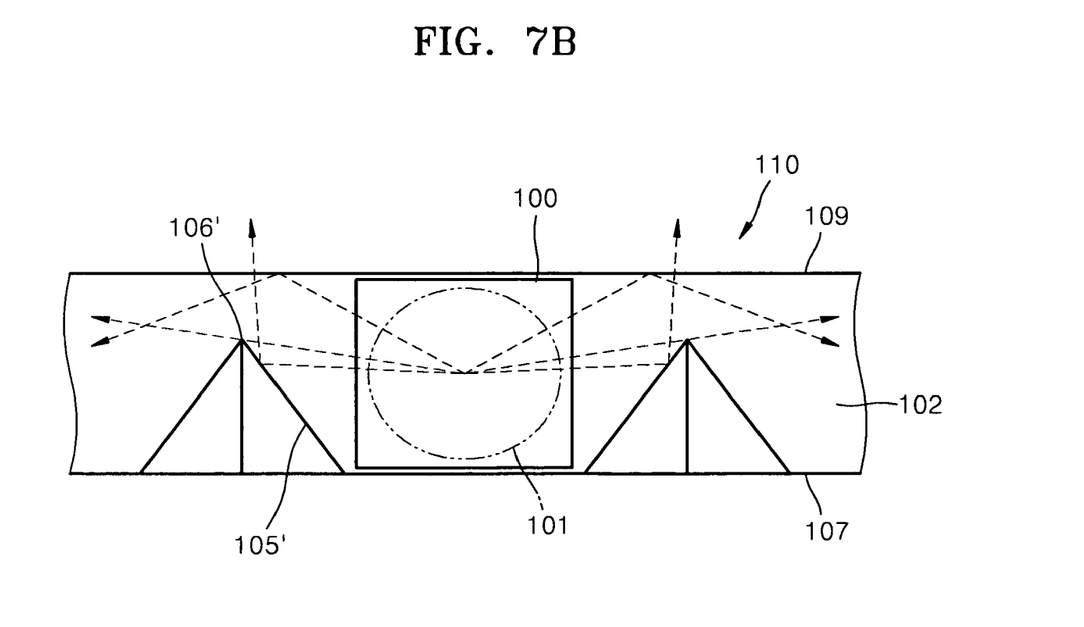
FIG. 7B illustrates the optical path at an incidence surface of the light guide panel of FIG. 7A.

In an exemplary embodiment of the present invention, dark portion reducing units 105' may have flat sides as illustrated in FIG. 7A, for example, in the form of semi-pyramids. The shape of the dark portion reducing units 105' is shown as a semi-pyramid in FIG. 7A, but the shape may be any polygon having more than three triangular surfaces. Each of the dark portion reducing units 105' has a vertex 106' disposed a predetermined distance away from the upper surface 109. As illustrated in FIG. 7B, a portion of the light emitted from the light emitting window 101 of the light source 100 proceeds to the upper surface 109 and the other portion of the light proceeds sideways. A portion of the light proceeding sideways is reflected by the dark portion reducing units 105' and heads to the upper surface 109. A portion of the light is transmitted through the upper surface 109, and the rest of the light is reflected toward the lower surface 107. The upper surface 109 has a critical angle depending on the difference between the refractive index of the light guide panel 100 and the refractive index of the medium outside of the light guide panel 100. The light incident at an angle smaller than the critical angle is transmitted and the light incident at an angle greater than the critical angle is reflected. The dark portion reducing units 105' are formed on the incidence surfaces between the light sources 100 and at both edges of the incidence surface 102.

Figure 8:
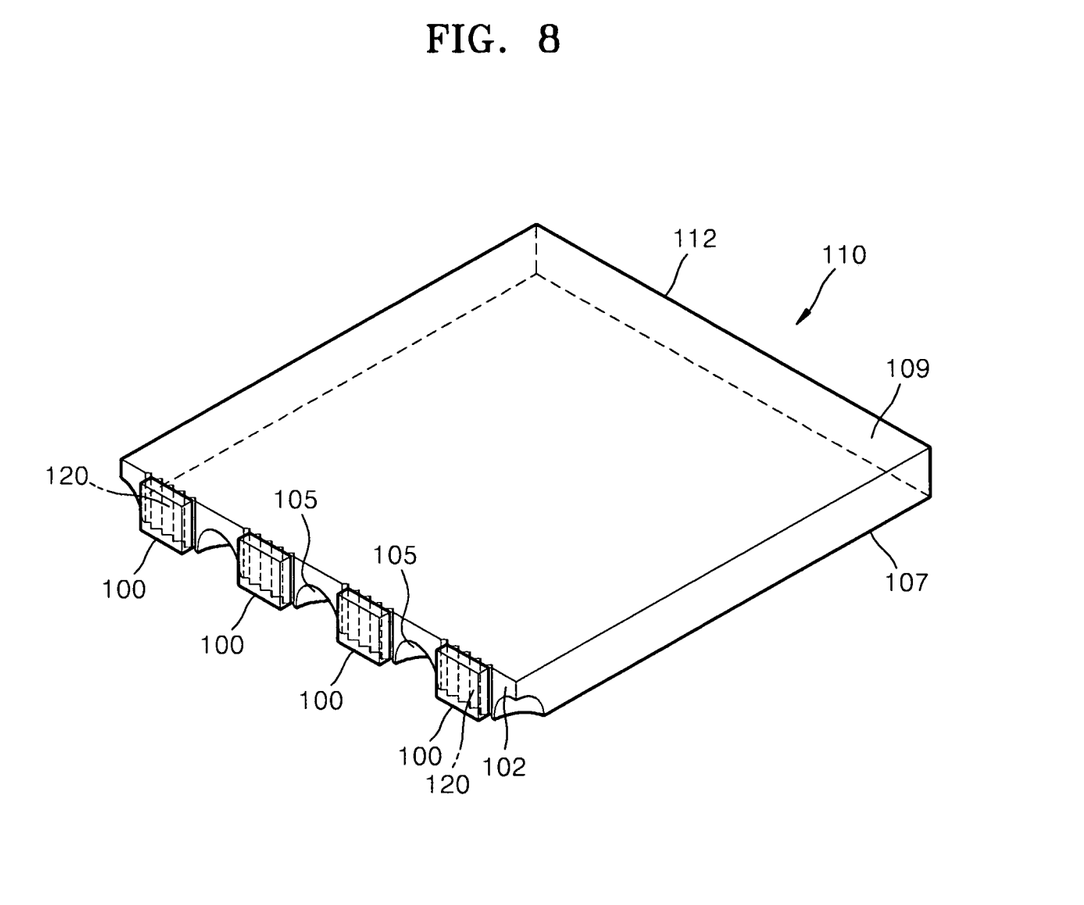
FIG. 8 is a perspective view of a light guide panel including a diffusion pattern according to an exemplary embodiment of the present invention.

Referring to FIG. 8, the light guide panel 110 may further include diffusion units 120 that are disposed in positions corresponding to the light sources 100 and diffuse the incident light onto incidence surfaces 102 facing the light sources 100. The diffusion units 120 diffuse the light received from the light sources 100 sideward to regulate brightness. That is, the light from the light sources 100 is refracted and reflected through the diffusion unit 120 forward and sideward, and a portion of the light proceeding sideward is reflected toward the upper surface by the dark portion reducing units 105 or 105', thereby suppressing the creation of the dark portions.

The light transmitted through the incidence surfaces 102 is reflected by the lower surface 107 and the upper surface 109, and proceeds to a surface 112 opposite to the incidence surfaces 102. A portion of the light proceeding from the incidence surfaces 102 to the surface 112 is transmitted through the upper surface 109 and proceeds toward a display panel (170 in FIG. 10), which will be described later.

Figure 9A:
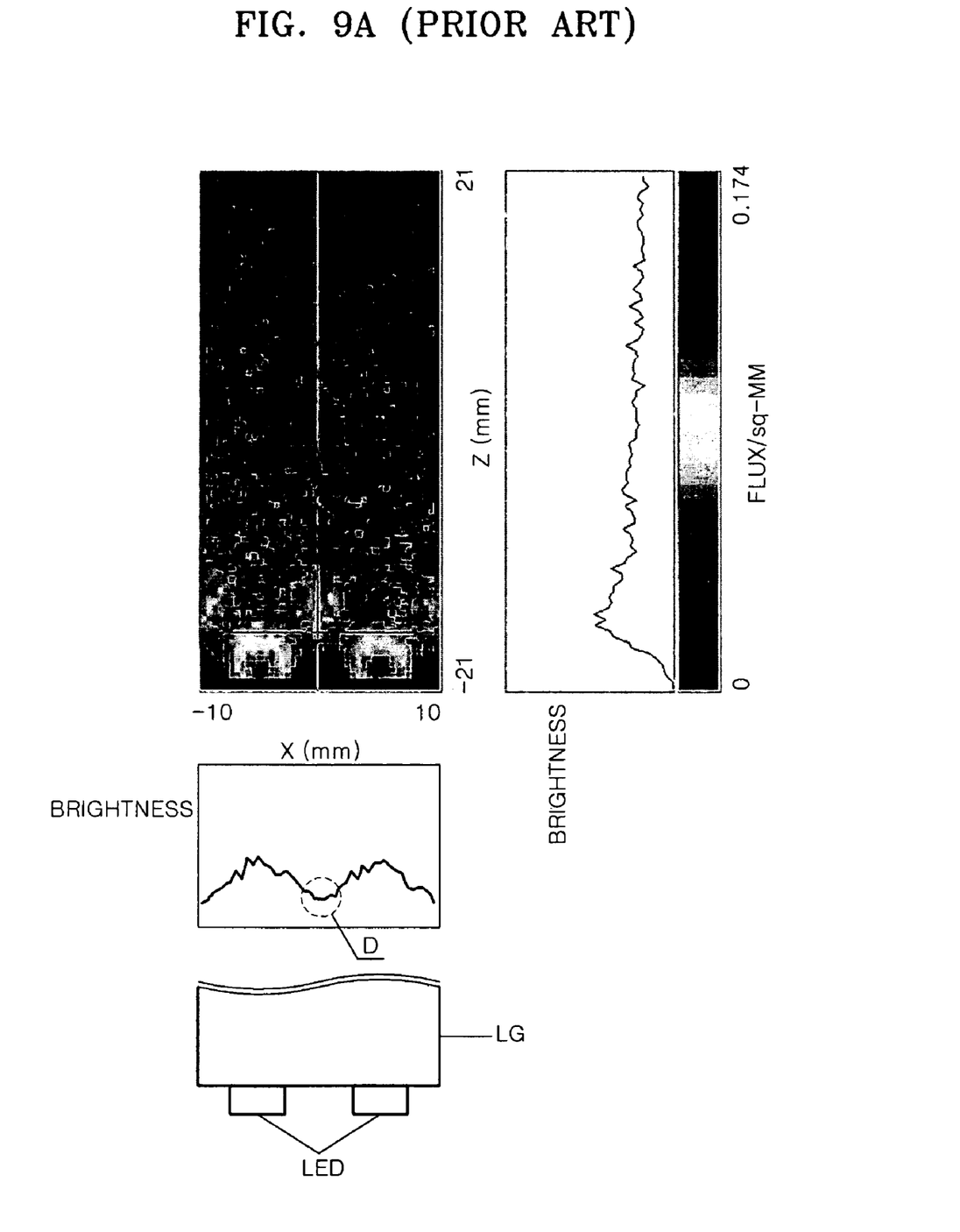
FIG. 9A illustrates the brightness of light on an incidence surface of the light guide panel of FIG. 1 and the brightness in the advancing direction of the light.

FIG. 9A illustrates the brightness of light on an incidence surface of a conventional light guide panel in an x-direction and in a z-direction (the direction from the incidence surface to a surface opposite to the incidence surface) while light is radiated to the light guide panel (LGP) by a conventional LED.

Figure 9B:
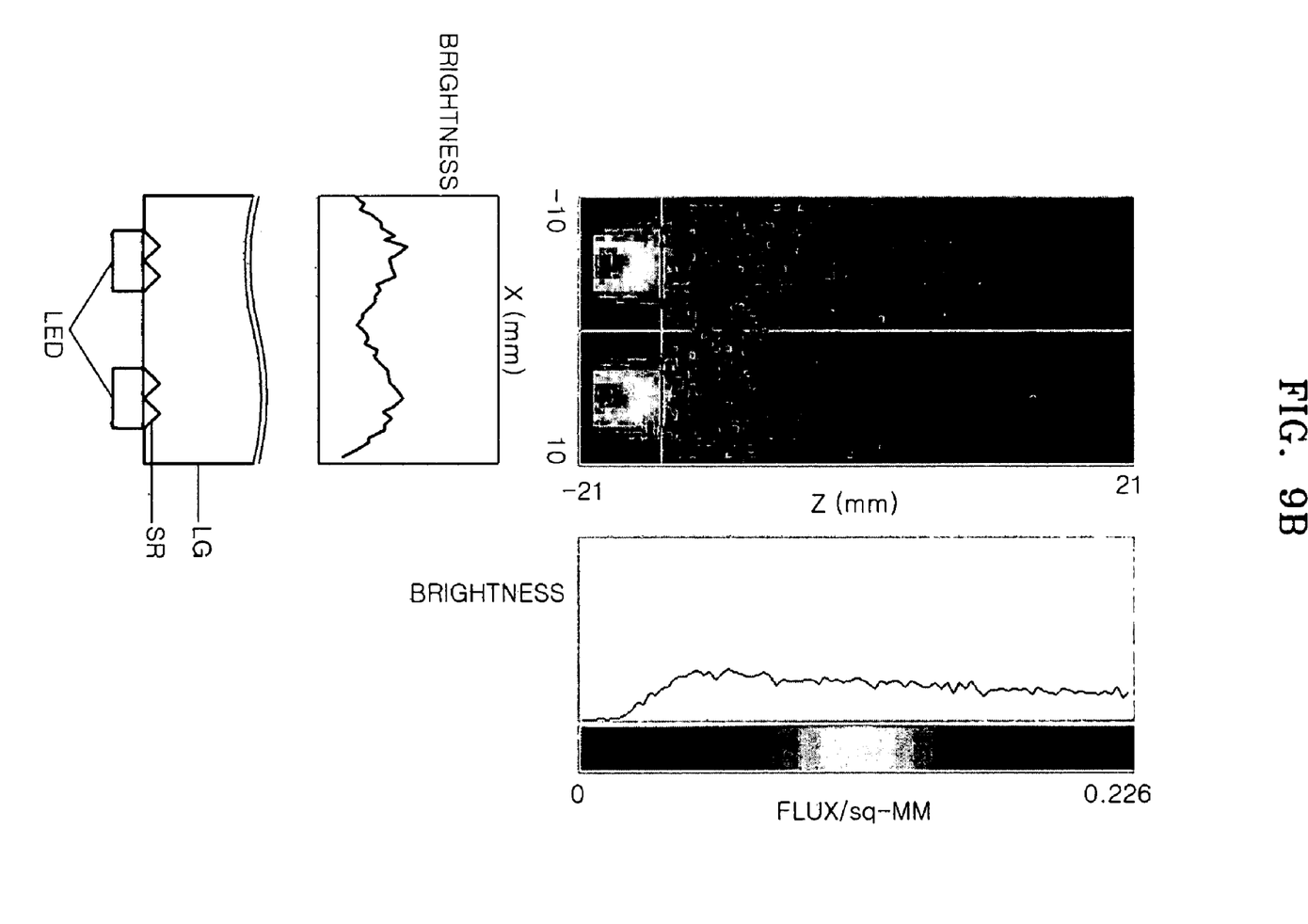
FIG. 9B illustrates the brightness of light on the incidence surface of a conventional light guide panel including diffusion patterns.

FIG. 9B illustrates the brightness of light on an incidence surface of a conventional light guide panel in the x-direction and the z-direction when the light guide panel includes only a diffusion unit 120. Though the diffusion unit 120 is formed, there are portions where the brightness between the LEDs is relatively low.

Figure 9C:
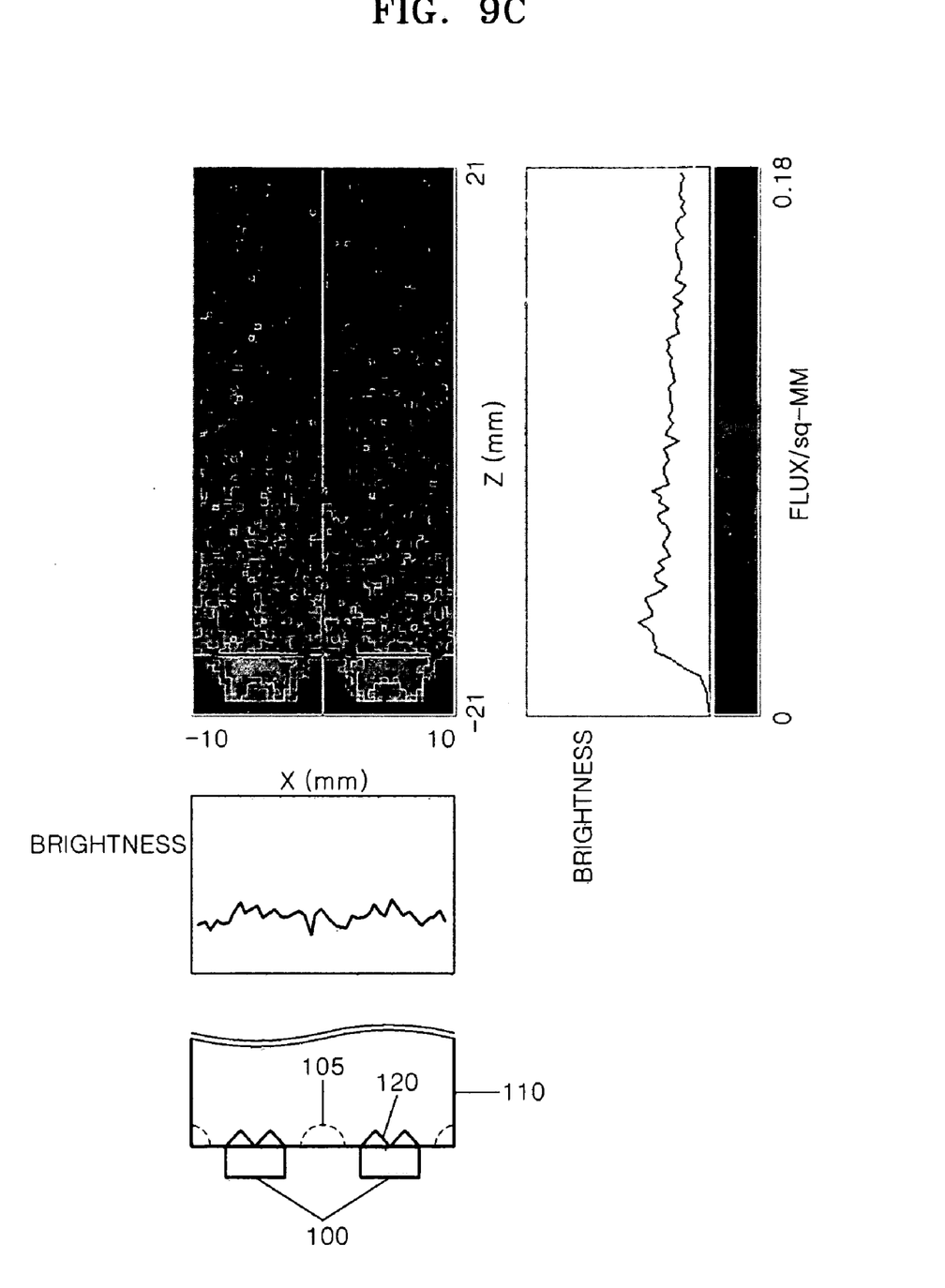
FIG. 9C illustrates the brightness of light on the incidence surface of the light guide panel of FIG. 8 and the brightness in the advancing direction of the light.

FIG. 9C illustrates the brightness on the incidence surface of a light guide panel according to an exemplary embodiment of the present invention in the x-direction and in the z-direction when the dark portion reducing units 105 are formed on the incidence surface between the LEDs 100 and diffusion units 120 facing the LEDs 100. The brightness exhibits better uniformity in the x-direction and the dark portion is reduced.

Figure 10:
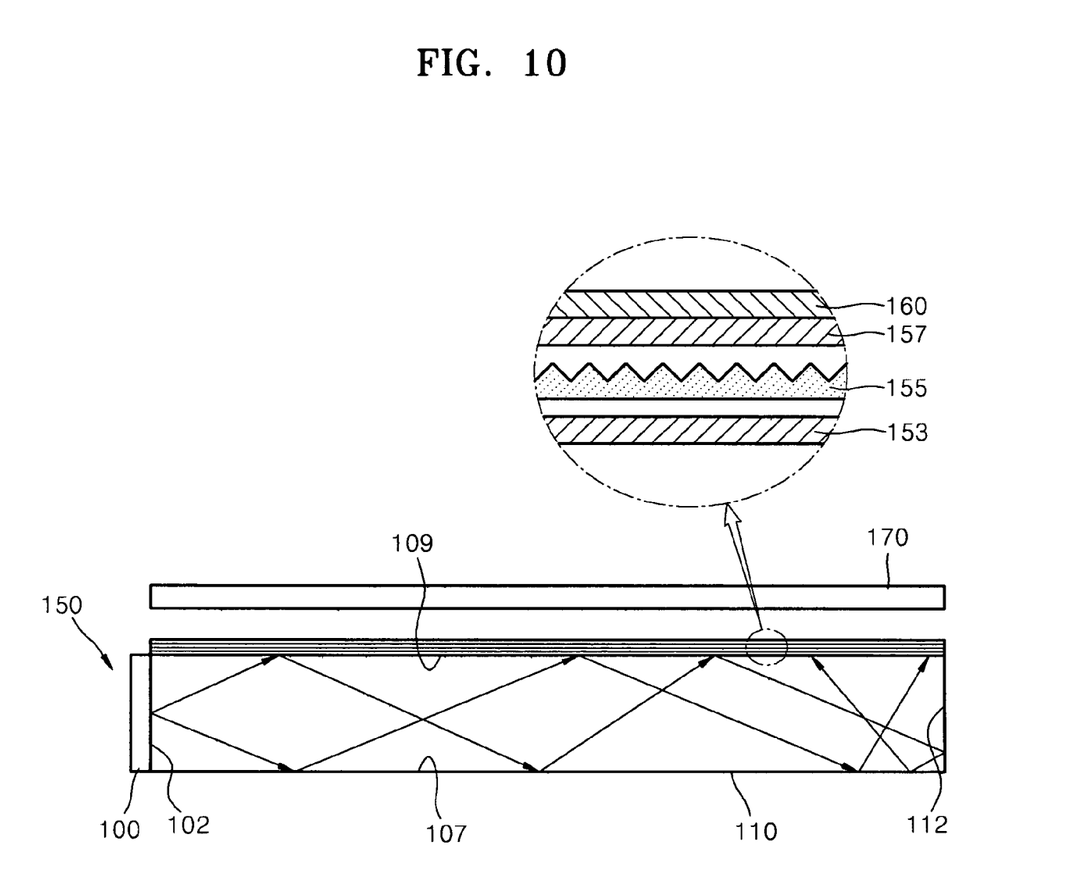
FIG. 10 is a cross-sectional view of a display device according to an exemplary embodiment of the present invention.

FIG. 10 is a cross-sectional view of a display device according to an exemplary embodiment of the present invention. Referring to FIG. 10, the display device includes a backlight unit 150 and a display panel 170 forming an image with the light radiated from the backlight unit 150. The backlight unit 150 includes a light source 100 and a light guide panel 110 guiding the light radiated from the light source 100 toward the display panel 170.

A diffusion plate 153 diffusing light and first and second prism sheets 155 and 157 correcting the light path are disposed between the light guide panel 110 and the display panel 170. The first and second prism sheets 155 and 157 cross each other and refract and focus the light from the diffusion plate 153 to improve the directivity of the light, thereby increasing the brightness and reducing the incidence angle of the light.

The display panel 170 may be a liquid crystal panel. In this case, a polarization enhancement film 160 may be further included above the second prism sheet 157, that is, the brightness enhancement film. The polarization enhancement film 160 may, for example, transmit p-polarized light and reflect s-polarized light and, thus, transmit most of the incident light as p-polarized light.

In FIG. 10, the light sources 100 are formed on one side of the light guide panel 110. However, the light sources 100 may also be formed on both sides in order to provide more light. When the light sources 100 are formed on both sides, dark portion reducing units may also be formed on each incidence surface of the light guide panel 110.

As described above, the light guide panel according to the exemplary embodiments of the present invention includes dark portion reducing units to reduce the distance between the light source and the light guide panel, thereby reducing an area of a screen rendered useless by dark portions. Thus, the display device including the light guide panel can be simplified and effectively applied to cell phones or small-sized terminals.

While the various aspects of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light guide panel comprising:
   an incidence surface facing a light source and which transmits light from the light source;
   an upper surface which transmits light transmitted through the incidence surface;
   at least one dark portion reducing unit formed in the incidence surface below the upper surface and positioned along the incidence surface adjacent to a position of the light source and which reflects light toward the upper surface; and
   a lower surface facing the upper surface which reflects light toward the upper surface,
   wherein the dark portion reducing unit comprises a groove that extends obliquely from the incidence surface toward the lower surface.

2. The light guide panel of claim 1, wherein the groove is a curved surface.

3. The light guide panel of claim 2, wherein the groove is semi-conical or semispherical.

4. The light guide panel of claim 1, wherein the groove has a plurality of flat surfaces.

5. The light guide panel of claim 1, wherein the groove is semi-pyramidal.

6. The light guide panel of claim 1, wherein the dark portion reducing unit is symmetrical about a vertical center line extending in a direction normal to the upper surface.

7. The light guide panel of claim 1, wherein a vertex on the incidence surface of the at least one dark portion reducing unit is distant from the upper surface.

8. The light guide panel of claim 1, further comprising a diffusion unit disposed on the incidence surface at the position of the light source and which diffuses light from the light source.

9. The light guide panel of claim 8, wherein the diffusion unit has a surface pattern having a saw-toothed profile.

10. The light guide panel of claim 1, wherein the at least one dark portion reducing unit comprises a plurality of grooves that extend obliquely from the incidence surface toward the lower surface.

11. The light guide panel of claim 1, further comprising:
    a plurality of light sources disposed along the incidence surface and separated by a predetermined distance.

12. The light guide panel of claim 11, wherein the at least one dark portion reducing unit is disposed between adjacent light sources.

13. The light guide panel of claim 1, wherein a top of the groove is positioned at a distance from the upper surface.

14. A display device comprising:
    a plurality of light sources;
    a light guide panel comprising:
       an incidence surface facing the light sources;
       at least one dark portion reducing unit disposed along the incidence surface between adjacent pairs of the light sources or at an edge of the incidence surface, and which reflects light from the light sources;
       an upper surface disposed at an angle to the incident surface and which transmits light; and
       a lower surface facing the upper surface and which reflects light toward the upper surface; and
    a display panel which forms an image using the light transmitted from the upper surface the light guide panel,
    wherein the at least one dark portion reducing unit comprises a groove that extends obliquely from the incidence surface toward the lower surface.

15. The display device of claim 14, further comprising a diffusion plate disposed above the upper surface of the light guide panel and which diffuses and transmits light.

16. The display device of claim 15, wherein the at least one dark portion reducing unit comprises a semi-pyramidal surface extending from the incidence surface toward the lower surface.

17. The display device of claim 14, wherein the at least one dark portion reducing unit comprises a curved surface extending from the incidence surface toward the lower surface.

18. The display device of claim 17, wherein the at least one dark portion reducing unit is semi-conical or hemispherical.

19. The display device of claim 14, wherein the at least one dark portion reducing unit comprises a plurality of flat surfaces extending from the incidence surface toward the lower surface.

20. The display device of claim 14, wherein the at least one dark portion reducing unit is symmetrical about a vertical center line extending in a direction normal to the upper surface.

21. The display device of claim 14, wherein a vertex on the incidence surface of the at least one dark portion reducing unit is distant from the upper surface.

22. The display device of claim 14, further comprising a diffusion unit disposed between the incidence surface and at least one of the light sources and which diffuses and transmits the light from the light sources.

23. The display device of claim 22, wherein the diffusion unit has a surface pattern having a saw-toothed profile.

24. The display device of claim 14, wherein a top of the groove is positioned at a distance from the upper surface.

* * * * *